S. H. BRUMMETT.
GEARING FOR PEANUT HARVESTERS.
APPLICATION FILED SEPT. 10, 1914.
1,245,565.
Patented Nov. 6, 1917.
2 SHEETS—SHEET 2.
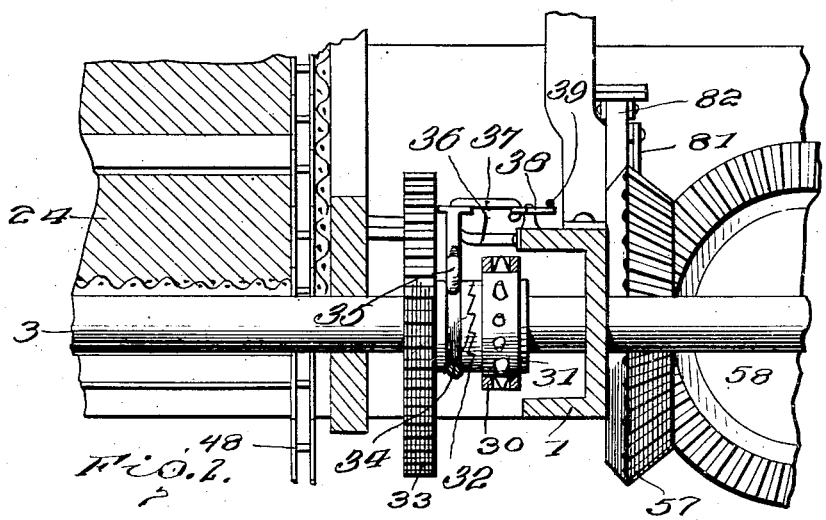
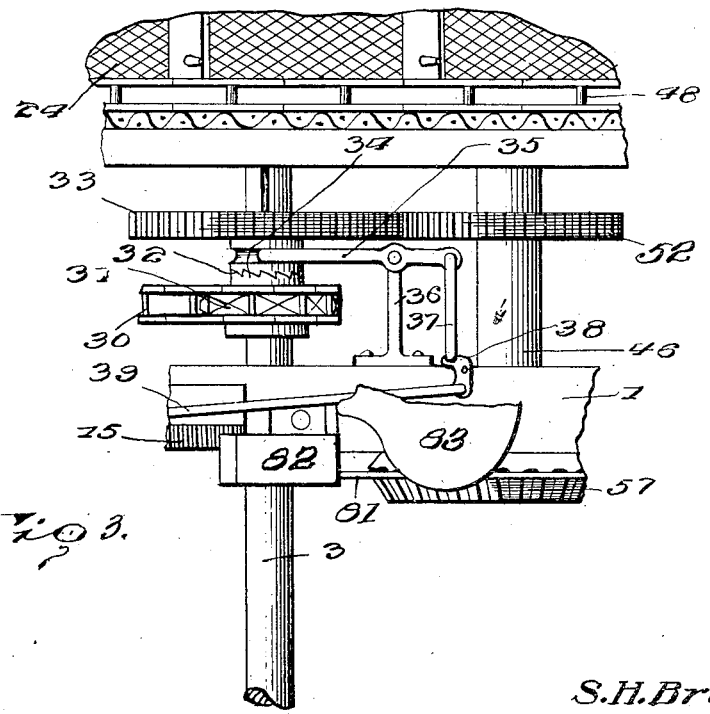
Witnesses
Inventor
S. H. Brummett,
By
Attorneys

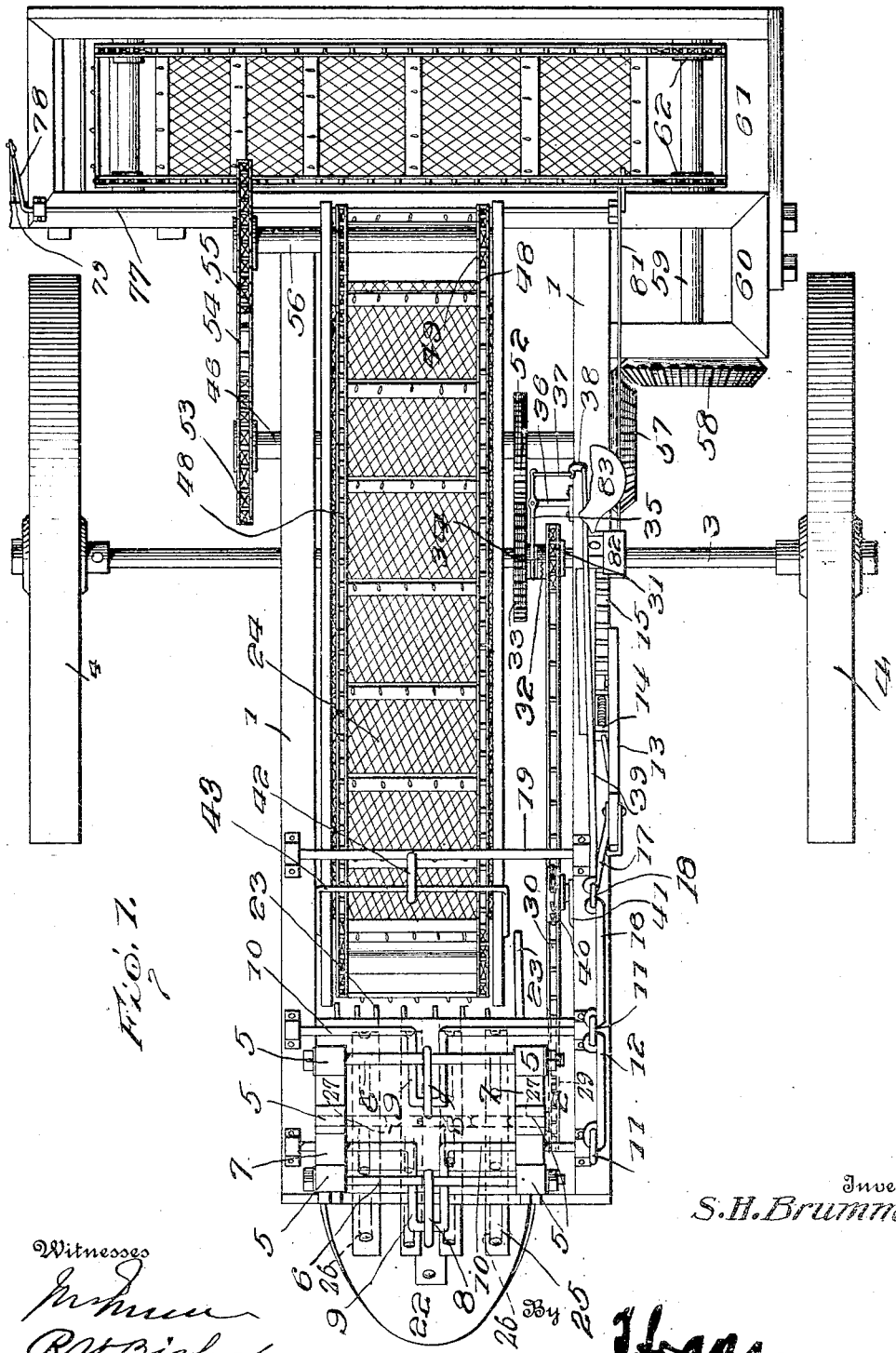

UNITED STATES PATENT OFFICE.

SINCLAIR H. BRUMMETT, OF SCRANTON, TEXAS.

GEARING FOR PEANUT-HARVESTERS.

1,245,565.  Specification of Letters Patent.  Patented Nov. 6, 1917.

Original application filed May 12, 1914, Serial No. 838,127. Divided and this application filed September 10, 1914. Serial No. 861,048.

*To all whom it may concern:*

Be it known that I, SINCLAIR H. BRUMMETT, citizen of the United States, residing at Scranton, in the county of Eastland and State of Texas, have invented certain new and useful Improvements in Gearing for Peanut-Harvesters, of which the following is a specification.

This invention relates to apparatus for transmitting motion, more particularly applicable to peanut harvesters and has special reference to the mechanism whereby the motion is transmitted from the main driving member to the conveyer device, the present application being a division of an application filed by me May 12, 1914, Serial No. 838,127.

The invention is illustrated in the accompanying drawings and is hereinafter fully described, the novel features being particularly pointed out in the claim following the detailed description.

In the drawings:

Figure 1 is a plan view of a peanut harvester embodying my improvements;

Fig. 2 is an enlarged transverse section taken substantially in the plane of the axle or driving shaft.

Fig. 3 is a detail plan view of the parts shown in Fig. 2.

In carrying out my invention I employ a main frame consisting of side bars 1, the front ends of which are connected by a platform 2 to which a suitable draft device may be connected in any convenient or preferred manner. An axle or driving shaft 3 is suitably journaled in the side bars and traction wheels 4 are secured to the ends of said axle, as will be readily understood. Slidably mounted in the platform 2, at the sides of the same, are vertical posts or standards 5 which are connected by suitable transverse bars or bolts 6, and also by longitudinally disposed bars or bolts 7. The uprooting mechanism or plow is carried by the lower ends of these standards, which constitute a strong support for the said mechanism, and the standards are supported at any desired height by means of links 8 which are pivoted at their upper ends upon the cross bars or bolts 6 and at their lower ends to the crank arms 9 provided centrally upon rock-shafts 10 which are suitably journaled upon the main frame. Two of the said rock-shafts are illustrated in the accompanying drawings arranged respectively adjacent the front and rear of the frame provided by the said standards 5 and at one side, preferably the left hand side of the machine, these rock-shafts are equipped with crank arms 11 connected by a link 12. The link 12 insures simultaneous movement of the rock shafts in the same direction, and the rear crank arm 11 is connected through suitable links with a lever 13 fulcrumed upon the main frame and equipped with a latch device 14 adapted to engage a segment 15 upon the main frame whereby the rock-shafts may be held in any set position and the vertical adjustment of the standards 5 maintained. In the present instance, the connection between the rear crank arm 11 and the lever 13 consists of links 16 and 17, the link 16 being attached to the crank arm 11 and to an intermediate crank arm 18, while the link 17 is connected to the said crank arm 18 and to the lever, as shown. The crank arm 18 is formed on one end of a rock shaft 19, the purpose of which will presently appear.

The plow or shovel 22 is carried by the lower ends of the front standards 5 and inclines downwardly and forwardly so that it will enter the ground in proper position to uproot the vines as the machine moves forward, and spaced rods or fingers 23 extend from the rear edge of the shovel over the forward end of the conveyer 24. These rods support the vines between the shovel and the conveyer and permit the loose dirt to fall to the ground. Immediately above the rods or fingers 23 I provide a gang of feeders which consist of longitudinally disposed heads or bars 25, and teeth 26 depending from the said bars and indicated by dotted lines in Fig. 1. The heads or bars are carried by a series of transverse rock-shafts 27 which are provided with crank portions passing through the said heads or bars so as to support the same. One of the said shafts is equipped at its end with a sprocket wheel 29 around which is trained a sprocket chain 30 whereby motion is imparted to the said sprocket wheel, and it will be readily understood that when the said shafts are rotated the feeders will be caused to move back and forth over the rods or fingers 23 so that the teeth 26 will take into the vines and force them upwardly along the said rods. The shafts rotate in such direction that when the feeders are moved rearwardly, they will be close to the said rods or fingers, but when they move forwardly they will be above the said rods and, consequently, will not engage the vines until they again descend and start to move rearwardly. Any number of these feeders may be employed, according to the capacity of the machine, and they should be of such a number that all the vines taken up by the plow will be engaged and positively fed over the rear ends of the fingers or rods 23. The sprocket chain 30 is trained around a sprocket wheel 31 which is loosely mounted upon the axle or driving shaft 3 and is provided with a clutch hub on its inner side, indicated at 32. A master gear 33 is slidably mounted upon the axle and constrained to rotate therewith, and this master gear is equipped with a clutch hub 34 which is adapted to engage the clutch hub 32 so that the rotation of the axle will be imparted to the sprocket wheel 31 and thence through the chain 30 and the sprocket 29 to the feeders. The clutch hub 34 is engaged by a lever 35 which is fulcrumed upon a standard 36 projecting inwardly from one side of the main frame and the rear end of this lever 35 is connected by a link 37 with one arm of an angle lever 38 which is fulcrumed upon the main frame. A link 39 connects the said angle lever with the crank arm 18 so that when the lever 13 is manipulated to raise the plow from the ground the master gear 33 will be moved away from the sprocket 31 and, consequently, the clutch members disengaged, whereupon the operation of the feeders will cease. It will be readily noted that when the lever 13 is swung rearwardly the links 17 and 16 will be drawn upon so as to swing the crank arms 11 rearwardly and thereby move the crank arms 9 upwardly so that the links 8 will rise and the standards 5 be lifted, consequently withdrawing the plow from the ground. The upward vertical movement of the plow-carrying standards will tend to slacken the sprocket chain 30 which may then be disengaged from the sprockets 29 and 31, and to prevent such disengagement I provide an idler 40 which engages the upper run of the said sprocket chain and is preferably carried by a resilient bracket 41 so that the chain will remain taut under all conditions.

The rock-shaft 19 is disposed transversely upon the main frame in rear of the plow carrying frame, as shown and before stated, and is equipped at about its center with a forwardly projecting crank arm 42 to which is attached the upper portion of a bail 43 which has its lower ends pivoted to the frame which supports the main conveyer. Said frame is pivotally hung upon the axle 3 and it will be readily noted that when the lever 13 is swung forwardly or rearwardly to lower or raise the plow carrying frame the shaft 19 will be simultaneously rocked to lower or raise the front end of the conveyer.

The main conveyer includes a frame formed of spaced sides mounted to swing upon the shaft or axle 3 and side chains 48 which pass around sprocket wheels 49 upon transverse shafts at the ends of the swinging side members. A counter-shaft 46 is journaled in the side bars of the main frame and is equipped with a gear wheel 52 which meshes with the master gear 33 in the operation of the machine. It will be readily noted that when the said master gear is shifted laterally to disengage it from the sprocket 31 it will be simultaneously moved out of mesh with the gear 52 so that the operation of all the moving parts will cease and, consequently, the machine may be drawn along a road or from one field to another without any wear upon the mechanism. Upon one extremity of the counter-shaft 46 I secure a sprocket wheel 53 around which is trained a chain 54, the said chain being also trained around a sprocket wheel 55 on the end of a shaft 56 which carries the sprocket wheels 49 at the upper end of the conveyer. Motion is thus imparted directly to the conveyer so that it will be operated simultaneously with the feeders and without interfering with the swinging adjustment of the conveyer frame upon the drive shaft or axle.

Upon the end of the shaft 46 remote from the sprocket wheel 53 is secured a beveled gear 57 which meshes with a similar gear 58 on the front end of a transmission shaft 59 which is disposed longitudinally of the machine and journaled in a lateral frame 60 or brackets at the rear end of the main frame. This transmission shaft 59 extends beyond the rear end of the main frame and is journaled in a transverse conveyer frame 61, as will be readily understood, sprocket pinions 62 being secured upon the said shaft within the said frame 61, as clearly shown in Fig. 1. Sprocket chains are trained around said sprocket wheels and similar wheels at the opposite end of the frame so that conveyer bars connecting said chains will be caused to carry the vines to and deposit them in a suitable receptacle, not shown. A rock shaft 77 is mounted on the frame 61 and is connected at one end, by crank arms 78 and 79 and link 80, with the basket so that the basket may be dumped when desired to discharge its contents. The opposite end of this rock shaft is connected by a link 81 with a foot lever 82 on the main frame so that it may be manipulated from the driver's seat 83.

In use, my improved machine is drawn over the field along the row of vines to be harvested, and the lever 13 is swung forwardly so that the master gear will be in engagement with the sprocket 31 and the gear 52, while the plow will be set to run at the proper depth below the surface of the ground. The rotation of the axle or driving shaft 3 will then be transmitted directly to the shaft 46 and the sprocket 29 so that the feeders will be set in motion and the elevator caused to travel upwardly in the elevator frame. The rear transverse conveyer will also be set in motion so that any vines delivered onto the same will be carried to and deposited in the receptacle at the end of the said conveyer. As the machine progresses the vines will be uprooted and will be fed over the separator rods or fingers 23 onto the main conveyer 24 and by the said conveyer will be carried up to and over and deposited on the rear transverse conveyer. The said rear transverse conveyer will deliver the vines to the basket and when a sufficient quantity has accumulated upon the said rods or fingers the driver will swing the lever 82 so that the basket will be dumped and the accumulation of vines will be deposited upon the ground.

It will be readily noted that in my machine the several parts are compactly arranged and are simple in construction so that they are not liable to get out of order, and repairs will be seldom needed. The several working parts are driven directly and positively and the vines will be fed continuously to the receptacle carried by the rear transverse frame. The plow may, obviously, be set to run at any desired depth and the master gear and the clutch members may be made of such dimensions that the shifting of the gear simultaneously with the adjustment of the plow-carrying frame will not disengage the gear members until the plow has been lifted entirely clear of the ground.

Having thus described the invention, what is claimed as new is:

In a device of the class described, shafts disposed in spaced relation, one of said shafts being constantly rotated, a driven member loose upon said constantly rotated shaft, a gear device mounted to rotate with the other of said shafts, a gear device rotative with said constantly driven shaft and slidable thereon and adapted to engage with said first mentioned gear device when in one position, means for coupling said slidable gear with the loosely arranged driven member when said gears are engaged one with the other, and means for shifting said slidable gear.

In testimony whereof I affix my signature in presence of two witnesses.

SINCLAIR H. BRUMMETT. [L. S.]

Witnesses:
R. M. BRUMMETT,
H. D. REESE.

Copies of this patent may be obtained for five cents each, by addressing the "Commissioner of Patents, Washington, D. C."